May 14, 1968  A. W. VASEL ETAL  3,382,762
SMOKE DETECTING DEVICE
Original Filed March 9, 1961
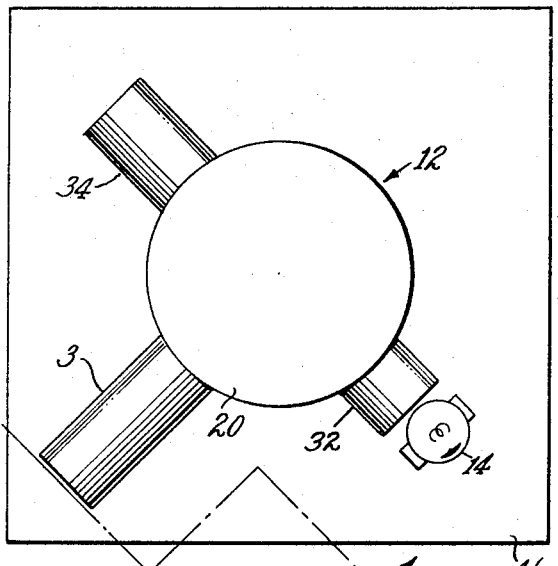
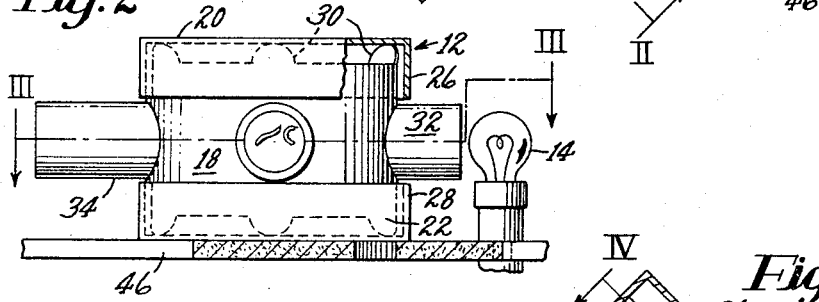
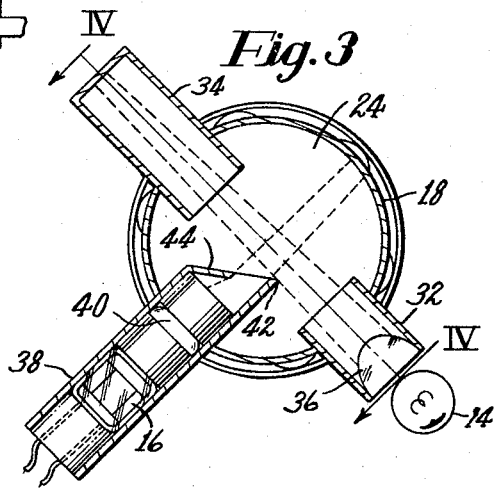
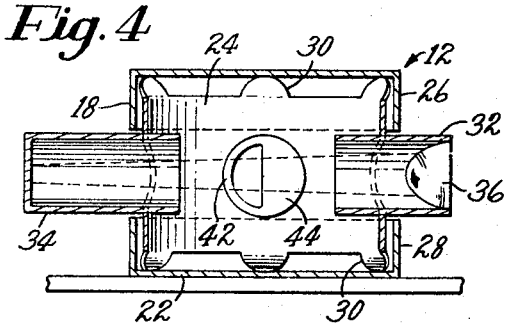
Inventors
Alfred W. Vasel
Rudolph W. Kalns
By their Attorney
Robert E. Ross

United States Patent Office 3,382,762
Patented May 14, 1968

3,382,762
SMOKE DETECTING DEVICE
Alfred W. Vasel, 222 Linwood St., Abington, Mass.
02351, and Rudolph W. Kalns, 18 Harding Ave., Braintree, Mass. 02184
Continuation of application Ser. No. 396,629, Sept. 15, 1964, which is a continuation of application Ser. No. 94,532, Mar. 9, 1961. This application Feb. 21, 1967, Ser. No. 617,717
4 Claims. (Cl. 88—14)

This is a continuation of application, Ser. No. 396,629 filed Sept. 15, 1964, now abandoned, which was a continuation of Ser. No. 94,532, filed Mar. 9, 1961, now abandoned.

This invention relates generally to a device for detecting particles in a fluid suspending medium, and has particular reference to an improved particle detector of the reflective or diffusion type.

Particle detectors of this type utilize a dark chamber having an internal light source, and a light detecting element disposed in the chamber shielded from direct radiation from the light source. When a fluid medium carrying suspended particles enters the housing through suitable apertures and passes through the beam from the light source the particles carried by the fluid medium cause radiation from the light source to be reflected or diffused onto the detecting element, which may be a photo-resistive device, for example, thereby actuating an external alarm system connected to the detector.

One disadvantage of such devices has been the fact that they are not reliably responsive to low particle concentrations for use in many applications. The amount of light falling on the detector will depend on the intensity of the light source and the particle concentration present in the fluid medium. Hence it would appear that an increase in the brightness of the light source would increase the sensitivity of the device, by providing more reflected or diffused light on the detecting device at low particle concentrations. However, an increase in the intensity of the light beam also increases the amount of stray light reflected from the interior walls of the housing onto the detector element. Although it is customary to blacken all internal surfaces of the housing, nevertheless an appreciable amount of stray light falls on the detector even when the fluid medium is free of particles.

Since the response of the detector is a function of the total amount of light falling thereon, including both stray light reflected from the housing walls and diffused light from smoke particles in the light beam, both of these factors must be taken into account in establishing the light level at which the alarm is to be actuated. If the alarm must respond to a very low particle concentration, and considerable stray light is present in the housing, the difference in light level between the ambient condition and the alarm condition will be very slight. Hence variations in intensity of the light source, due to fluctuations in line voltage or due to filament deterioration or battery voltage, will vary the required particle concentration to actuate the alarm. A decrease in light source intensity resulting from a decreased source voltage will reduce the stray light component, hence a greater particle concentration will be required to actuate the alarm. Increases in source voltage may cause sufficient increase in stray light intensity to actuate the alarm even when the medium is free of particles.

An even more serious problem in the construction of such a device is preventing variations in external light from affecting the cell. Since apertures must be provided to permit the diffusion of ambient atmosphere into the chamber, no matter how well the apertures are baffled, when the external light intensity is high, some light will enter the chamber. Hence provision must be made for preventing high intensity ambient light from causing sufficient response of the cell to actuate the alarm, without restricting the free diffusion of ambient atmosphere through the chamber.

Hence it is apparent that it is desirable that the amount of stray light in the housing be low as possible, so that as large a percentage as possible of the total light necessary to actuate the alarm will be provided by diffusion from particles carried in the fluid medium.

The object of this invention is to provide a particle detector of the diffusion type which is so constructed as to reduce the amount of stray light falling on the detector to a minimum.

A further object of the invention is to provide a particle detector of the type described in which the detector is arranged to receive radiation from only a predetermined portion of the light beam when particles are present in the fluid medium.

Other objects of the invention will be apparent to one skilled in the art from the following detailed description of a specific embodiment thereof.

In the drawing:

FIG. 1 is a top plan view of a particle detecting device embodying the features of the invention;

FIG. 2 is a view in side elevation of the device of FIG. 1 along the line II—II as seen in the direction of the arrows, partly broken away;

FIG. 3 is a view in section taken on line III—III of FIG. 2;

FIG. 4 is a view in section taken on line IV—IV of FIG. 3.

Referring to the drawing, there is illustrated a particle detector 10, which comprises generally a housing 12, a light source 14 disposed outside the housing, and a detector element 16 disposed in the housing in operative relation to appear hereinafter.

The detector 10, in the illustrated embodiment, is particularly adapted for use as the detector unit of a smoke alarm and for this purpose the housing 12 comprises a peripheral wall or main body portion 18 and a pair of end caps 20 and 22 darkening an internal chamber 24. The end caps extend beyond the periphery of the wall 18 and have inwardly turned flanges 26 and 28 which are spaced outwardly from the wall. Each end of the wall is provided with a series of outwardly inclined spacing lugs 30, which are adapted to engage frictionally the inner surface of the flanges to retain the caps in assembly. The flanges 26 and 28, in conjunction with the spacing lugs 30, form a peripheral passageway having sets of apertures opening the chamber 24 at each end of the wall to permit smoke to enter the chamber from the surrounding atmosphere.

To direct and control the beam from the light source 14, a focusing tube 32 extends through the housing wall on one side thereof, and a light trap tube 34 is disposed in the housing wall on the opposite side in alignment with the focusing tube 32. A lens 36 of the converging type is disposed in the focusing tube 32, with a focal length such that light from the source 14 is focused in a converging beam onto the bottom of the light trap tube 34, so that the beam from the light has a minimum size at the bottom of said trap, and substantially none of the light from the source falls on any other portion of the interior surface of the housing.

A detector tube 38 extends through the housing wall between the light trap tube and the focusing tube, and is disposed generally perpendicular to the axes thereof. The detector element 16 is disposed in the detector tube, and to restrict the field of view of the detector, a lens 40 of the converging type is disposed in the detector tube between the detector element and the chamber. The lens 40 has a focal length such that the image of the detector element is focused onto a minimum area on the opposite surface of the housing wall and the cone of focus of the detector element is directed across the cone of focus of the light beam, so that the detector element views only the medial portion of the light beam and the field of view of the cell at the opposite wall portion is confined to the medial portion of the wall, so that the cell does not view the peripheral apertures at the top and bottom of the wall. Hence substantially no light reaches the detector element except light appearing in the focus cone of the lens 40. To further insure that a minimum amount of the internal stray light reaches the detector element, the end 42 of the detector tube on the side adjacent the light tube extends forwardly to the cone of focus of the light beam to provide a shield against stray light from the inside surface of the focus tube. The end of the detector tube from this foremost point is inclined rearwardly at an angle such that the inside surface of the detector tube cannot view the inside surface of the focus tube. To prevent stray reflected light from the inside of the light tray tube from reaching the detector lens 40, the side of the end of the detector tube adjacent the light trap tube is provided with an inclined shield 44.

In the illustrated embodiment the housing 12 is adapted to be mounted onto a support panel 46, and the light source 14 is also mounted on the panel in alignment with the focusing tube 32, and connected to a suitable source of electric current. The external mounting of the light source provides a visual check on its condition and makes replacement convenient.

The detector element 16 may be any type of device which is responsive to a change in light intensity, such as a photo-electric or a photo-resistive cell. One type of cell which has been found satisfactory is cadmium sulfide, which responds to an increase in light intensity by a decrease in resistance. Hence in the illustrated embodiment a detector circuit (not shown) may be connected to the detector element and adjusted to the cell resistance under normal conditions of no smoke so that a predetermined further decrease in cell resistance will actuate an external alarm connected to the detector circuit. When smoke enters the housing and appears in the light beam, light from the smoke particles in the portion of the light beam viewed by the detector is reflected or diffused onto the detector cell, thereby lowering the resistance of the cell and actuating the alarm circuit. Alarm circuits for this purpose are well known in the art, and do not form a part of the present invention.

The apertures in the housing of applicants' device must be large enough to permit free diffusion of the surrounding atmosphere into the chamber, and it is therefore impossible to keep out *all* ambient light. Since the intensity of the ambient light will vary, means must be provided to minimize the effect on the detector cell of such variations.

This is not a matter of sensitivity but a problem of the ratio of the response of the cell under conditions of the minimum amount of smoke to be detected to the response of the cell under conditions of strong external illumination, as will be described hereinafter.

Assuming that it is desirable to have the alarm actuated when 2% smoke is present in the atmosphere (defined as the amount of smoke in a column 1 foot long that reduces the light intensity by 2%) then it is desirable that the ratio of cell conductivity under such conditions to the conductivity under conditions of no smoke and high intensity external illumination be as great as possible.

This requirement can be best understood by reference to the following test data:

Using a smoke labyrinth as shown in the drawing, the position of the lens 40 was varied to vary the field of view of the cell. In each position, the response of the cell was measured (as microamperes current through the cell) under the following conditions (1) normal with no smoke and no ambient light (2) with 2% smoke present in the housing and (3) with a strong light beam on the exterior of the housing directed at the peripheral apertures. Following are the results obtained.

| | Cell Position #1 | Cell Position #2 | Cell Position #3 | Cell Position #4 |
|---|---|---|---|---|
| A. Distance of Lens from cell | 0 | 1/8" | 1/4" | 3/8" |
| B. Relative Size of Field of View | 2×2 | 1.5×1.5 | 1×1 | .75×.75 |
| C. Normal Cell, Current, Microamperes | 8 | 5 | 2.5 | 1.5 |
| D. Cell Current with 2% Smoke Microamperes | 46 | 43 | 36 | 22.5 |
| E. Cell Current with High Intensity Ambient Light Microamperes | 80 | 60 | 27 | 11 |
| Ratio E/D | 1.74 | 1.4 | .75 | .49 |

The above data may be analyzed as follows:

In the illustrated embodiment of the device, the lens is positioned 3/8" from the cell, even though the greatest sensitivity is obtained when the lens is directly against the cell.

The least sensitivity is obtained when the lens is in the position shown in the drawing.

In this latter position the current under 2% smoke conditions is only 21 microamperes greater than normal whereas a difference of 38 microamperes could be obtained, with resulting greater sensitivity at no increase of cost or complexity.

However, when a beam of light is directed against the outside of the housing the light that enters the chamber has a much greater effect on the cell when the lens is in position #1 than when it is in position #4.

When the lens is in the position which provides greatest sensitivity to smoke high intensity external light provides a greater cell response than is provided by 2% smoke, and hence the alarm would be actuated.

However, when the lens is in position 4 the field of view is restricted so that high intensity ambient light causes a cell response which is only about half of that resulting from 2% smoke.

Hence it is seen that by *reducing* the sensitivity of the device, the *effectiveness* is radically increased.

The construction of the cell thereby reduces to a minimum the amount of stray light from both internal and external sources falling on the cell during conditions of no smoke, hence changes in cell resistance with variations of brightness of the source or variations in ambient light are minimized. With the resistance of the detector cell, under no smoke conditions more nearly constant than has been heretofore possible, the detector circuit may be adjusted to reliably detect lower smoke concentrations than would be the case if the circuit had to accommodate wide variations in cell resistance during no smoke conditions.

Although the illustrated embodiment of the invention is intended for use as a detector of smoke in air, it will be understood that the invention is also adapted to the detection of other types of suspended particles in either a gaseous or liquid medium. Means may also be provided for directing a continuous flow of the suspending medium throughout the detector chamber.

Since certain other obvious changes may be made in the device without departing from the scope of the invention, it is intended that all matter contained herein be interpreted in an illustrative and not in a limiting sense.

We claim:

1. A smoke detector comprising, a chamber having a wall structure darkening the inside of said chamber, there being spaced shielded apertures through said wall structure interommunicating with each other through said chamber, and for shielding said chamber against ambient light and allowing the ambient atmosphere to circulate through said chamber, projector means arranged with said chamber for projecting a beam of light across said chamber in a direction leading away from a first wall portion and toward a light absorbent second wall portion of said chamber medially between said spaced apertures for said light beam to impringe upon said light absorbent second wall portion, and a light responsive device and lens means shielded from direct light from said projector means and optically aligned in a direction leading away from and toward respectively third and fourth opposite wall portions of said chamber disposed medially between said first and second wall portions and medially between said spaced apertures, having said lens means disposed between said light beam and said light responsive device in a light transmitting relation to said device and viewing through a region of said light beam in a direction intersecting said light beam and for the view to extend into a region of said chamber located beyond the far side of said light beam from said lens means, and said lens means having a focal length and being positioned with respect to said light responsive device so as to provide an area of view within said region of said light beam to be appreciably larger than the area of view of said lens means within said chamber region beyond said light beam, whereby the ratio of the amount of light transmitted through said lens means to said light responsive device when particles of smoke enter said chamber and reflect light from said region of said beam, to the amount of light transmitted through said lens means to said light responsive device without smoke in said chamber, is increased since said lens means has a decreased area of view in said region beyond said light beam as compared to the area of view in said beam.

2. A smoke detector comprising a chamber having a peripheral wall, end caps disposed over the top and bottom ends of the wall, each cap having shielding flanges depending from the periphery thereof to surround the adjacent end portions of the wall, said caps and said flanges being spaced from the adjacent end of the wall to create a peripheral passageway at each end of the wall for diffusion of ambient atmosphere through the chamber, said wall and said end caps darkening the inside of the chamber, a light source outside the chamber, said wall having a first aperture therethrough and means associated with the aperture for directing a light beam from the light source across the interior of the chamber to a light-absorbent wall portion, a second aperture through the wall, a tubular member disposed in said second aperture and extending generally transversally to the direction of said light beam, a light responsive device in said tubular member aligned to view a portion of said light beam in a direction toward an opposite wall portion disposed substantially midway between the first aperture and the light absorbent wall portion, and lens means disposed between the light beam and the light responsive device, said lens means being so positioned and having optical characteristics such that the area of view of the light responsive device within the region of the light beam is approciably larger than the area of view thereof within the chamber region beyond the light beam, whereby the ratio of the amount of light transmitted through said lengs means to said light responsive device when particles of smoke enter said chamber and reflect light from said region of said beam, to the amount of light transmitted through said lens means to said light responsive device without smoke in said chamber, is increased since said lens means has a decreased area of view in said region beyond said light beam as compared to the area of view in said beam.

3. A smoke detector comprising, a chamber having a wall structure darkening the inside of said chamber, there being spaced shielded apertures through said wall structure intercommunicating with each other through said chamber, and for shielding said chamber against ambient light and allowing the ambient atmosphere to circulate through said chamber, projector means arranged with said chamber for projecting a beam of light across said chamber in a direction leading away from a first wall portion and toward a light absorbent second wall portion of said chamber medially between said spaced apertures for said light beam to impinge upon said light absorbent second wall portion, and a light responsive device and lens means shielded from direct light from said projector means and optically aligned to view in a direction toward a third wall portion of the chamber disposed in spaced relation to any of said apertures, said lens means disposed between said light beam and said light responsive device in a light transmitting relation to said device and viewing through a region of said light beam in a direction intersecting said light beam the view extending into a region of said chamber located beyond the far side of said light beam from said lens means, and said lens means having a focal length and being positioned with respect to said light responsive device so as to provide an area of view within said reigon of said light beam to be appreciably larger than the area of view of said lens means within said chamber region beyond said light beam, whereby the ratio of the amount of light transmitted through said lens means to said light responsive device when particles of smoke enter said chamber and reflect light from said region of said beam, to the amount of light transmitted through said lens means to said light responsive device without smoke in said chamber, is increased since said lens means has a decreased area of view in said region beyond said light beam as compared to the area of view in said beam.

4. A smoke detector, comprising a chamber having a wall structure darkening the inside of the chamber, there being spaced shielded apertures through said wall structure inter-communicating with each other through said chamber for allowing ambient atmosphere to circulate through the chamber, a light source for projecting a light beam across said chamber, and a light responsive device shielded from direct light from the light source and being positioned to view transversely a portion of the light beam, wherein the improvement comprises lens means associated with the light responsive device to restrict the field of view of the light responsive device in the chamber beyond the light beam to an area less than the area of the field of view within the light beam, whereby the ratio of the amount of light transmitted through said lens means to said light responsive device when particles of smoke enter said chamber and reflect light from said region of said beam, to the amount of light transmitted through said lens means to said light responsive device without smoke in said chamber, is increased since said lens means has decreased area of view in said region beyond said light beam as compared to the area of view in said beam.

References Cited
UNITED STATES PATENTS

| | | | |
|---|---|---|---|
| 1,900,477 | 3/1933 | Whittemeier | 88—14 |
| 1,924,239 | 8/1933 | Thomas. | |
| 2,299,529 | 10/1942 | Crampton | 250—218 X |
| 2,537,028 | 1/1951 | Cahusac et al. | 340—237 X |
| 2,684,008 | 7/1954 | Vonnegut | 88—14 |
| 2,873,644 | 2/1959 | Kremen et al. | 250—218 X |
| 2,909,960 | 10/1959 | Orr et al. | 88—14 |
| 2,925,007 | 2/1960 | Silver | 250—218 |
| 3,094,625 | 6/1963 | Hendrick | 250—218 |

JEWELL H. PEDERSEN, *Primary Examiner.*

O. B. CHEW, *Assistant Examiner.*